W. H. BINES.
SELF OILING MINE CAR WHEEL AND AXLE.
APPLICATION FILED OCT. 2, 1913.
1,091,796.
Patented Mar. 31, 1914.
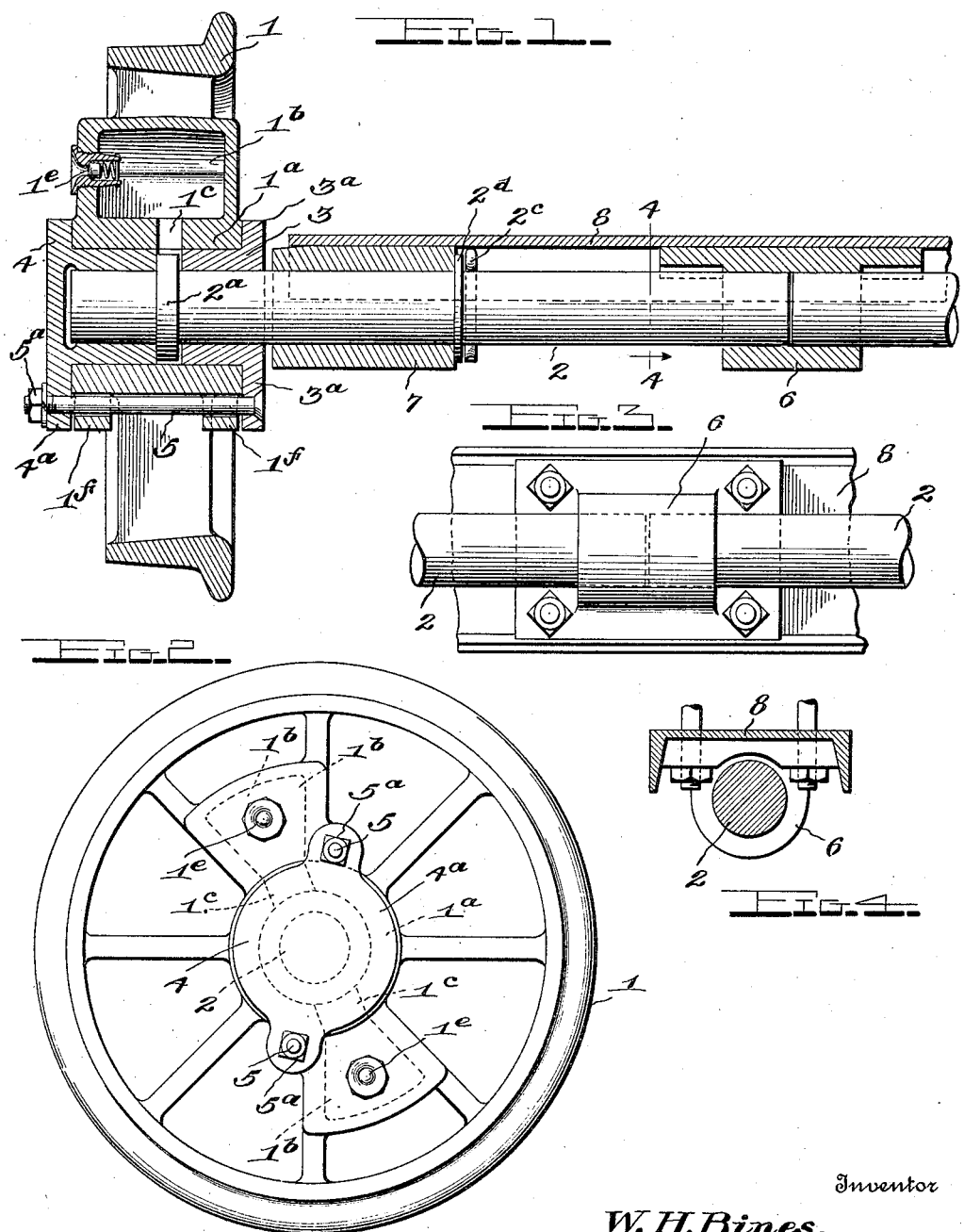
Witnesses
Chas. L. Griestauer.
W. Wallace Nairn Jr.
Inventor
W. H. Bines,
By Dowell & Dowell
Attorneys

UNITED STATES PATENT OFFICE.

WILLIAM H. BINES, OF BARNESVILLE, OHIO, ASSIGNOR OF ONE-HALF TO ANDREW J. BAGGS, OF BARNESVILLE, OHIO.

SELF-OILING MINE-CAR WHEEL AND AXLE.

1,091,796.     Specification of Letters Patent.     Patented Mar. 31, 1914.

Application filed October 2, 1913. Serial No. 792,980.

*To all whom it may concern:*

Be it known that I, WILLIAM H. BINES, a citizen of the United States, residing at Barnesville, in the county of Belmont and State of Ohio, have invented certain new and useful Improvements in Self-Oiling Mine-Car Wheels and Axles; and I hereby declare that the following is a full, clear, and exact description thereof, reference being had to the accompanying drawings, which form part of this specification.

This invention is a novel improvement in car wheels and axles especially those designed for mining cars.

The invention comprises a self-oiling wheel having an oil reservoir in its hub with ports leading to the bore of the hub, and an axle having an integral thrust collar within the hub of the wheel which holds the wheel in place by contact with bushings in the hub, such collar being entirely within the hub of the wheel and taking the end thrust of the wheel in both directions. The axle is preferably made in two parts, to permit the inner bushings to be slipped thereon; and the bushings are secured to the wheel hub by means of bolts so that when all the parts are in position the wheel is rotatably but firmly mounted upon the axle and is held from longitudinal rotation thereon, and the thrust bearing and bearings of the wheel on the axle are thoroughly lubricated.

The objects of the invention in short are, to provide a thrust bearing inside of the wheel hub acting in both directions; to thoroughly lubricate such thrust bearing; to provide the wheel with bushings that can be readily replaced when worn out without renewing the entire wheel; to provide an axle only one section of which will need be renewed if broken or injured in any way; to reduce friction by thoroughly lubricating the bearings, thus making the wheel run more easily; to dispense with washers and pins or similar means in rubbing contact with the wheel hub for securing the wheel to the hub; and to make the wheel secure, reliable and safe in operation.

I will explain the invention as embodied in the construction shown in the drawings, and will set forth in the claims the essential features of the invention and the preferred novel specific feature of the construction illustrated for which protection is desired.

In said drawings—Figure 1 is a longitudinal sectional elevation of a car wheel and portion of the axle and the axle bearings showing the preferred construction of the invention. Fig. 2 is a face view of the wheel shown in Fig. 1. Fig. 3 is a view showing the axle bearings. Fig. 4 is a cross-section on line 4—4, Fig. 1.

The wheel in general may be of any suitable construction, and has a bore which is of larger internal diameter than the shaft on which the wheel is to be mounted. The hub is provided exterior to the bore with an oil reservoir. As shown in Fig. 1 two diametrically opposite oil reservoirs $1^b$ are shown formed between the spokes of the wheel on the exterior of the hub $1^a$, each of these reservoirs communicating with the bore of the hub through a radial opening $1^c$ in the hub. The reservoirs can be supplied with oil through suitable openings which may be sealed by a spring closure $1^e$, that are well known and form no part of the present invention.

The axle 2 is provided with an annular thrust collar $2^a$ which is preferably formed integral therewith and is entered within the bore of the hub $1^a$ of the wheel; and fitted within the hub at opposite sides of this thrust collar $2^a$, are cylindric bushings 3 and 4; the inner bushing 3 is fitted on the shaft 2 at the inner side of the collar while the bushing 4 is fitted on the shaft at the outerside of the collar. Said bushings are also fitted neatly within the bore of the hub; and are respectively provided with flanges $3^a$ and $4^a$ on their outer ends which are fitted closely against the outer ends of the hub. The bushings are securely fastened to the wheel in any suitable way. As shown they are held firmly in position by means of through-bolts 5 which extend through the flanges $3^a$, $4^a$ and through lugs or ears $1^f$ on the hub of the wheel. The said bolts may be secured by means of nuts $5^a$ or any other suitable means, so as to rigidly fasten the bushings in and to the wheel hub and cause them to rotate with the wheel.

The inner ends of the bushings 3 and 4 almost contact with the opposite sides of the thrust-bearings $2^a$, and when the parts are connected together as illustrated in Fig. 1 the wheel is rotatably mounted upon the shaft 2 and is held from longitudinal movement thereon by the thrust collar 2ª lying intermediate the bushings 3 and 4. The thrust bearings for the wheel are thus contained within the wheel hub and undue longitudinal movement of the wheel on the axle is prevented thereby.

The thrust bearing 2ª preferably is in line with the ports 1ᶜ and oil from the reservoir 1ᵇ is supplied directly to the thrust bearing to the journal of the wheel on the axle and these parts are lubricated most effectively and efficiently. The flanges 3ª, 4ª of the bushings may be ground to fit closely against the ends of the hub so that lubricant will not be wasted; and dust and grit will be effectively excluded from the wheel bearings.

I prefer to make the inner bushing 3 a solid one-piece casting; preferably of brass or other suitable anti-friction metal; and therefore, in order to enable such bushings to be placed on the axle at the inner side of the thrust bearing 2ª the axle may be made in two sections. As indicated in the drawings the axle is divided at the center, the inner ends of the related axle sections being contained in a bearing 6, while the outer portion of the axle is journaled in a bearing 7, said bearings 6 and 7 being preferably rigidly attached to an angle-iron beam 8, as indicated in the drawings. After the bushing 3 is slipped on the axle section 2 the section can be placed in the bearings 7 and 6 and may be retained in position against endwise movement by means of a cotter-pin 2ᶜ tapped through the axle adjacent the inner end of the bushing 7, a washer 2ᵈ being preferably interposed between the cotter-pin and the adjacent end of the bushing 7. The cotter-pin takes up any outward thrust or pull on the axle section 2, while the inward pull or thrust on one axle section will be taken up by the other related axle section.

The wheel 1 may have an annular oil reservoir extending entirely around the hub as indicated at 1ᵍ in Fig. 5, and in such case the bolts 5 extend through the oil reservoir, but are preferably surrounded by metal, as indicated at 1ʰ in Fig. 5, so that the oil cannot escape from the reservoir through the bolt openings.

What I claim is:

1. A wheel having a hub, an axle having a thrust collar on its end within the bore of the hub, removable bushings surrounding the axle and fitted within the hub bore at opposite sides of the thrust collar, and having flanges on their outer ends at the opposite ends of the hub, and means for fastening the said bushing flanges to the ends of the hub.

2. A wheel having an axial bore extending through its hub, and an axle having a thrust collar on its portion within the bore of the hub, removable bushings fitted within the hub bore at opposite sides of the thrust collar, and journaling the axle thereon, said bushings having flanges on their outer ends at the opposite ends of the hub, and bolts fastening said flanges to the adjacent ends of the hub.

In testimony that I claim the foregoing as my own, I affix my signature in presence of two witnesses.

WILLIAM H. BINES.

Witnesses:
 KATE M. BAGGS,
 W. O. CHAPPELL.

---

Copies of this patent may be obtained for five cents each, by addressing the "Commissioner of Patents, Washington, D. C."